United States Patent
Bacelli et al.

(10) Patent No.: US 11,703,027 B1
(45) Date of Patent: Jul. 18, 2023

(54) SELF-TUNING WAVE ENERGY CONVERTER (WEC) CONTROLLER FOR CHANGING SEA STATES

(71) Applicant: National Technology & Engineering Solutions of Sandia, LLC, Albuquerque, NM (US)

(72) Inventors: Giorgio Bacelli, Albuquerque, NM (US); David G. Wilson, Tijeras, NM (US); Dominic Forbush, Billings, MT (US); Steven J. Spencer, Albuquerque, NM (US); Ryan G. Coe, Taos, NM (US)

(73) Assignee: National Technology & Engineering Solutions of Sandia, LLC, Albuquerque, NM (US)

( * ) Notice: Subject to any disclaimer, the term of this patent is extended or adjusted under 35 U.S.C. 154(b) by 0 days.

(21) Appl. No.: 17/866,083

(22) Filed: Jul. 15, 2022

Related U.S. Application Data

(60) Provisional application No. 63/222,108, filed on Jul. 15, 2021.

(51) Int. Cl.
    *F03B 13/14* (2006.01)
    *F03B 15/00* (2006.01)

(52) U.S. Cl.
    CPC ............ *F03B 13/14* (2013.01); *F03B 15/00* (2013.01)

(58) Field of Classification Search
    CPC .................................. F03B 13/14; F03B 15/00
    USPC ............................. 60/495, 497; 290/42, 53
    See application file for complete search history.

(56) References Cited

U.S. PATENT DOCUMENTS

| | | | | |
|---|---|---|---|---|
| 2007/0068153 | A1* | 3/2007 | Gerber | F03B 13/20 60/497 |
| 2011/0042954 | A1* | 2/2011 | Werjefelt | F03B 13/20 290/53 |
| 2016/0290311 | A1* | 10/2016 | Thresher | F03B 13/20 |
| 2019/0093623 | A1* | 3/2019 | Nguyen | H02P 21/13 |
| 2020/0088154 | A1* | 3/2020 | Wilson | F03B 13/14 |
| 2020/0095972 | A1* | 3/2020 | Tona | F03B 15/00 |
| 2020/0095974 | A1* | 3/2020 | Han | F03B 13/10 |

OTHER PUBLICATIONS

Cho, H. et al., "Model Predictive Control Tuning by Inverse Matching for a Wave Energy Converter," Energies (2019) 12:4158, 18 pages.

\* cited by examiner

*Primary Examiner* — Hoang M Nguyen
(74) *Attorney, Agent, or Firm* — Daniel J. Jenkins

(57) ABSTRACT

Systems and methods for a WEC controller that uses a self-tuning proportional-integral control law prescribing motor torques to maximize electrical power generation and automatically tune the controller to maximize power absorption. In an embodiment, the controller may be part of any resonant WEC system. The control law relies upon an identified model of device intrinsic impedance to generate a frequency-domain estimate of the wave-induced excitation force and measurements of device velocities. The control law was tested in irregular sea-states that evolved over hours (a rapid, but realistic time-scale) and that changed instantly (an unrealistic scenario to evaluate controller response).

12 Claims, 2 Drawing Sheets

SELF-TUNING WAVE ENERGY CONVERTER (WEC) CONTROLLER FOR CHANGING SEA STATES

CROSS-REFERENCE TO RELATED APPLICATION

This application claims the benefit of U.S. Provisional Application No. 63/222,108, filed Jul. 15, 2021, entitled "Self-Tuning Energy Converter (WEC) Controller for Changing Sea States," which is incorporated herein by reference.

GOVERNMENT INTEREST STATEMENT

This invention was made with Government support under Contract No. DE-NA0003525 awarded by the United States Department of Energy/National Nuclear Security Administration. The U.S. Government has certain rights in this invention.

FIELD OF THE INVENTION

The present invention is directed to wave energy converters, and more particular to a controller that adjusts the converter absorber in changing sea-states to maximize electrical power capture.

BACKGROUND OF THE INVENTION

Harvesting energy from ocean waves presents a number of technical and practical challenges that must be overcome for this source of renewable energy to be economical. Intelligent control of a wave energy converter (WEC) can significantly enhance power capture and reduce overall cost of energy. Theoretically, optimal control of a WEC requires advanced knowledge of the affecting wave. While there is significant focus on accurate future-state wave prediction and prediction-based WEC control strategies, this architecture remains difficult to implement in practice. The prediction is needed in real-time, which requires either a displaced or remote measurement of incoming waves and an accurate model of wave propagation, or a state-estimation procedure that can be computationally intensive. Both approaches can be confounded in short-crested wave fields, a commonly occurring sea state for which plane-wave approximations are poor wave propagation models.

What is needed are WEC control systems and methods that overcome the limitations of the prior art.

SUMMARY OF THE INVENTION

The present disclosure is directed to WEC control systems that use a frequency-domain estimate of the current sea-state to automatically tune the controller to maximize power absorption. The controller optimizes WEC performance over the changing sea-states to which the device will be subjected. The controller uses self-tuning control law that adjusts the motor torques of a three degree-of-freedom wave energy conversion system, which may be referred to as a point absorber, in changing sea-states to maximize electrical power capture. The control law uses a spectral estimation of the wave excitation forces that relies on an identified model of device intrinsic impedance. The performance of the control law is considered by comparing the gains resulting from the self-tuning approach to post-calculated optimal gains for a given sea-state.'

According to an embodiment of the disclosure, a method for controlling the energy production of a wave energy converter (WEC) platform on a body of water, the method includes monitoring motor energy output and at least one energy parameter of one or more motors of the WEC platform, each motor of the one or more motors actuated by wave motion; monitoring sea state of the body of water using device impedance models that receive inputs from sensing and measuring WEC platform motion and monitoring the frequency spectrum of the WEC platform motion; analyzing motor energy output of the one or more motors and sea state to determine a controller gain that optimizes the energy production of the WEC platform; and applying the control law at the one or more motors to set torque at the one or more controllers. The controller gain determines motor torque of the one or more motors based on the WEC platform motion and provides the controller gain to motor drive circuits of the one or more motors to set torque delivered to the motor based on the determination of controller gain, and the at least one energy parameter is selected from frequency of WEC platform motion or motor velocity.

According to another embodiment of the disclosure, a wave energy converter control system is disclosed that includes a controller that uses a frequency-domain estimate of the current sea-state to automatically tune the controller to maximize power absorption by using a self-tuning control law to adjust the motor torques of a wave energy converter in changing sea-states to maximize electrical power capture.

According to another embodiment of the disclosure, a wave energy conversion system is disclosed that includes a wave energy converter (WEC) platform. The WEC platform includes a housing, a carriage disposed within the housing, a float connected to the housing by a shaft that is partially disposed within the carriage, and one or more motors connected to the carriage or housing. The one or more motors are powered by the float responding to a wave in corresponding one or more degrees-of-freedom corresponding to heave pitch and surge of the wave. The wave energy conversion system further includes a wave energy converter control system that includes a controller that uses a frequency-domain estimate of the current sea-state to automatically tune the controller to maximize power absorption by using a self-tuning control law to adjust the motor torques of a wave energy converter in changing sea-states to maximize electrical power capture.

Other features and advantages of the present invention will be apparent from the following more detailed description of the preferred embodiment, taken in conjunction with the accompanying drawings which illustrate, by way of example, the principles of the invention.

BRIEF DESCRIPTION OF THE DRAWINGS

Wherever possible, the same reference numbers will be used throughout the drawings to represent the same parts.

DETAILED DESCRIPTION OF THE INVENTION

The present disclosure is directed to a WEC controller that uses a self-tuning proportional-integral control law prescribing motor torques to maximize electrical power generation. In an embodiment, the controller is part of a wave energy conversion system that includes a wave energy conversion platform and the controller. Here, we considered a three degree-of-freedom (DOF) WEC, but the WEC system may any multi-DOF WEC or array of WECs.

The control law relies upon an identified model of device intrinsic impedance to generate a frequency-domain estimate of the wave-induced excitation force and measurements of device velocities. The control law was tested in irregular sea-states that evolved over hours (a rapid, but realistic time-scale) and in sea-states that changed instantly (an unrealistic scenario to evaluate controller response). For both cases, the controller converges to gains that closely approximate the post-calculated optimal gains for all degrees of freedom. Convergence to near optimal gains occurred reliably over a sufficiently short time for realistic sea states. In addition, electrical power was found to be relatively insensitive to gain tuning over a broad range of gains, implying that an imperfectly tuned controller does not result in a large penalty to electrical power capture. In an embodiment, the control law allows for adaptation to a changing device impedance model over time for long-term deployments.

According to an embodiment of the disclosure, a wave energy converter control systems is disclosed that includes a controller that uses a frequency-domain estimate of the current sea-state to automatically tune the controller to maximize power absorption by using a self-tuning control law to adjust the motor torques of a wave energy converter in changing sea-states to maximize electrical power capture.

According to another embodiment of the disclosure, a control method for adjusting wave energy converter performance over changing sea-states is disclosed that uses a self-tuning control law to adjust the motor torques of a point absorber in changing sea-states to maximize electrical power capture.

Figure 1:
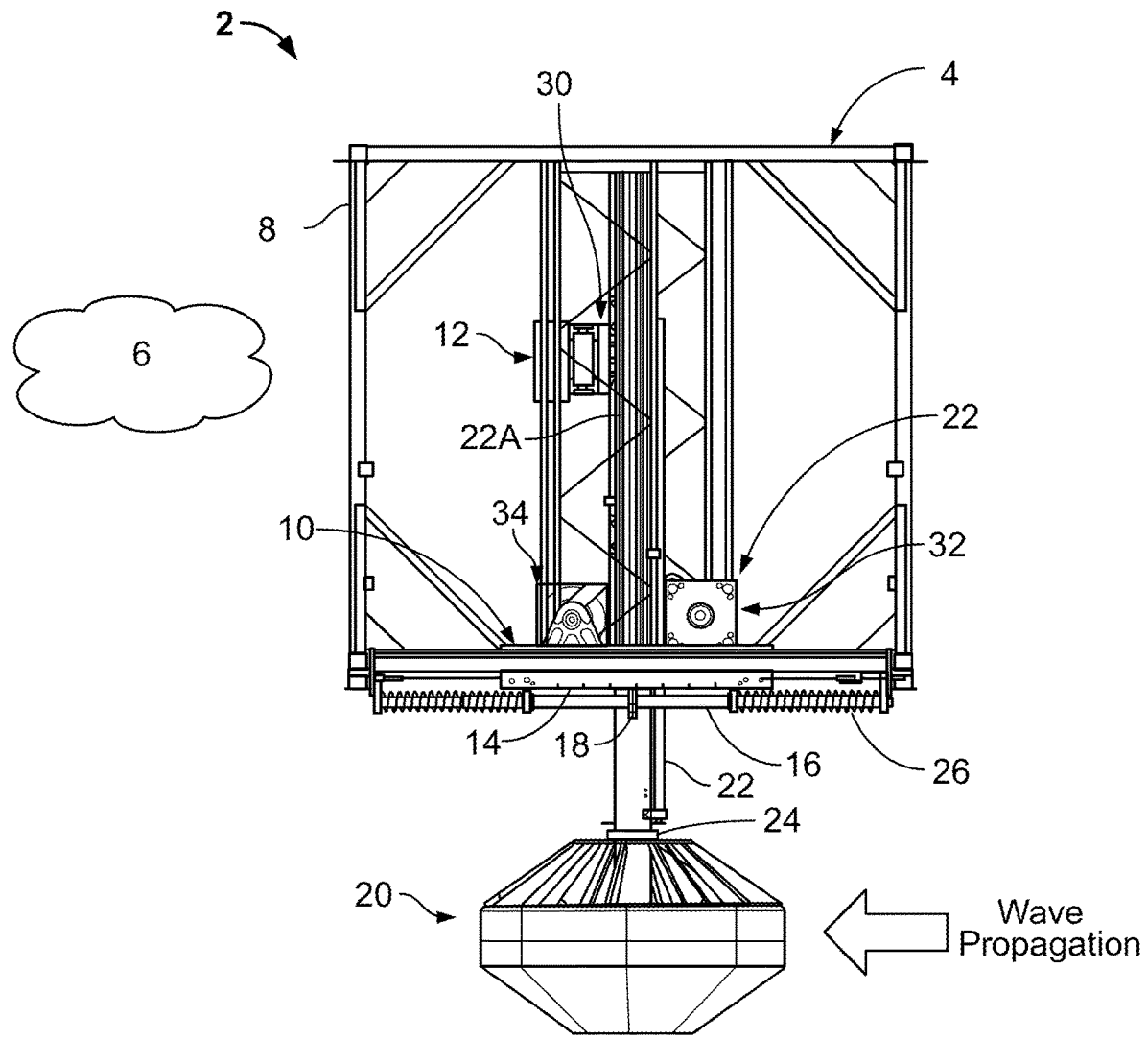
FIG. 1 is a simplified diagram of a prior art 3-DOF WaveBot device, axi-symmetric about the z (heave) axis and control system according to an embodiment of the disclosure.

FIG. 1 shows a wave energy conversion system 2 that includes a wave energy conversion platform 4 and a control system 6 according to an embodiment of the disclosure. In this embodiment, the platform 4 is referred to as a WaveBot. The WaveBot 4 is an axi-symmetric three degree-of-freedom (DOF) point absorber actuated in heave, pitch, and surge by wave motion. Heave is in the vertical direction (up/down), referred to as the z axis, caused by wave motion. Surge is in the direction of wave propagation, which will be referred to as the x axis, caused by wave motion. Pitch is rotational motion about the y axis, which is perpendicular to the x axis.

The WaveBot 4 is attached to a structure (not shown) that allows for the system to be displaced upon a body of water in such a manner that the float resides at least partially above the water. In an embodiment, the structure may be a fixed structure, such as a bridge, offshore oil and gas platform, or offshore wind platform. In other embodiment, the WaveBot 4 may be attached to a float or other buoyant platform that allows the system to ride upon or be positioned upon the body of water. The control system demonstrated on this specific WaveBot is broadly applicable to all resonant WEC designs.

The WaveBot 4 includes a housing or framework 8. The framework 8 includes a carriage 10 and a power-take-off (PTO) tower 12. The carriage 10 holds the PTO tower and allows the WEC to surge backwards and forwards with the incoming wave. The PTO tower 12 provides a rail for the pitch actuator motor 24 (see below) to be supported as it moves vertically with the shaft 22 (see below).

The framework 8 further includes a bottom platform 14 on or near the bottom of the framework 8 upon which the carriage 10 and PTO tower 12 are attached. The bottom platform 14 has room within the bottom of the framework 8 to move in the x axis. The bottom platform 14 also has an aperture through which the shaft 18 passes from the float 16 into the carriage. The bottom platform 14 is attached to a rail or rod 16 by attachment 18 that allows the shaft 18 to move in the x axis. The bottom platform 14 may be attached to additional rails or rods that support the bottom platform 14 within the framework 8 while allowing for x axis movement.

The WaveBot 4 further includes a float 20 that moves in three DOF caused by wave propagation. The float 20 can move in an up/down, z axis, motion caused by wave heave. The float 20 can move in the direction of wave propagation, surge or x axis, caused by the force of the wave acting upon the float. The float 20 can be pitched or moved in a direction rotating about the y axis that is perpendicular to the x axis.

The float 20 is attached to the framework 8 by the shaft 22. The float 20 is attached to the shaft 22 by a coupling 24 that allows the float 20 to pitch. The shaft 22 includes an internal shaft 22a that can move vertically independently from the shaft 22 that is used to drive a pitch actuator motor 30 as described below.

The shaft 18 moves vertically within the framework 8 and carriage 10 as the float 20 rises and falls to drive a heave actuator motor 32. In this exemplary embodiment, the heave actuator motor 32 is driven by the rising and falling of the shaft 22 via a belt (not shown) that is attached to the shaft 22 that spins a pully (not shown) in the heave actuator motor 32. In other embodiment, the heave actuator motor 32 may be driven by cables, toothed rails, or other coupling devices.

The shaft 22 can move in the x axis (direction of wave propagation) and as the shaft 2 is coupled to the bottom platform 14 and rod 16, those components also move in the x axis. A surge actuator motor 34 that is attached to the bottom platform 14 and carriage 10 also moves in the x axis. In this exemplary embodiment, a belt (not shown) attached to the framework 8 drives a pully on the surge actuator motor 34 as the surge actuator motor 34 moves in the x axis (in FIG. 1, cycling left to right) relative to the stationary framework 8, and thus the surge actuator motor 34 generates electricity. In other embodiments, the surge actuator motor 34 may be driven by cables, toothed rails, or other coupling devices.

In this exemplary embodiment, the framework includes springs 26 over the rod 16 that assists in returning the shaft 22 to a center position within the framework 8. In other embodiments, the framework 8 may include springs, elastic members or other tensioning devices to assist in returning the shaft 22 to the center position.

The shaft 18 can move in a pitch direction. To be visually descriptive referencing FIG. 1, the edge of the float 20 facing the viewer of FIG. 1 moves up and down (pitches) while the opposing edge (not shown), correspondingly moves down and up. The rocking or pitching of the float 20 lifts and drops the internal shaft 22a within the shaft 22 via a gearhead (not shown) within the float 20. In this exemplary embodiment, the internal shaft 22a is coupled to the pitch actuator motor 30 by a belt such that the lifting and dropping of the internal shaft 22a relative to the pitch actuator motor 30, the belt drives a pully on the pitch actuator motor 30 to generate electricity. The pitch actuator motor 30 is stationarily attached to the shaft 22 and moves up and down with the shaft 22. The pitch actuator motor 30 moves vertically along the PTO tower 12 as the shaft 22 rises and falls.

The PTO tower 12 houses the heave and pitch drive trains (not shown) that transmits motion between the pitch and heave actuator motors 30, 32 and PTO tower 12. The drive train for the surge motor is primarily located on the carriage, but there are components that are on the framework.

As discussed above, the WaveBot 4 includes independent rotary motor/generators for each DOF, a pitch actuator motor 30, a heave actuator motor 32 and a surge actuator motor 34 that generate DC electricity from wave motion causing a mechanical movement in the motors. Each motor is connected to a common bus (not shown) to allow for an external electrical connection to provide electricity to a common user, such as a grid or remote power loads (e.g., ocean sensing). In an embodiment, each motor is electrically connected to a common 300V DC bus. In an embodiment, the rotary motor/generators are identical.

The control system 6 provides commands to the motors proportional/integral (PI) controller to adjust motor torque to maximize electricity (energy) production. In the arrangement described above, the controller applies a force to the WEC via a belt transmission system (heave and surge) or a driveshaft and a float-contained gearhead (pitch) based upon measurements of velocities in each degree of freedom from shaft-mounted motor encoders (heave and surge) or an inertial motion unit in the float (pitch).

In this exemplary embodiment, the control system 4 is part of an operational system (not shown) that uses sensing information such as prevailing sea state, power demand, and potential other factors, to determine control system commands, such as, but not limited to on/off/torque, (any others). The operational system may operate a simulation that uses network inputs to determine operational control commands as discussed below. The operational system and control system may be connected via a communication network to the motors. In an embodiment, the communication network may be an ethernet connection.

The controller command process is:

1: determine the optimal controller gains based on a history of recent motion, which in itself captures the frequency content of the prevailing wave; and 2: apply these optimal controller gains to determine the torque based on a standard PI control logic.

Step 1 is performed by using the history of recent motion to capture the frequency spectrum of the excitation force, Fe(w) (sea state). Note that Fe(w) is the complete description of sea state, "sea state" being the more colloquial term. How this is done is described in detail in paragraphs [0039]-forward below. Given Fe(w), the optimal controller gains are then selected based on eq. (6), and the following Control Approach and Control Process sections, where a discussion of the analysis is described.

Step 2 is performed by commanding a torque to be applied by the motors=CΩ as defined by eq. (3) and (5).

Control Approach

The theoretically optimal power-maximizing control law for an ideal WEC device uses a compensator that is the complex conjugate of the WEC intrinsic impedance, that is, the complex ratio of the device velocity to imposed force at each frequency. The non-causal nature of this controller implies that an estimate of the future input to the device is necessary for implementation on a real system. However, complex conjugate control behavior can be approximated by a feedback controller over a specific range of frequencies. Since realistic sea-states show excitation over relatively narrow bandwidths, this approximation has practical application. Sea-states also evolve in time: this suggests that the approximated controller must be able to adapt to the given sea state, ideally with no additional sensing. The method uses a control law that requires only an estimate of device intrinsic impedance and measurements of WEC velocities to maximize device electrical power over all DOFs in changing sea states. The intrinsic impedance of a WEC follows from the general frequency-domain equations of motion. By simply rearranging and collecting terms, the WEC intrinsic impedance can be defined $$Z_i(\omega) = i\omega(M + m(\omega)) + B_v + R(\omega) + \frac{S}{i\omega} \qquad (1)$$

where M and m are the static and added inertia matrices for the device, $B_v$ is the viscous damping matrix, R is the radiation damping matrix, S is the hydrostatic stiffness matrix, and ω is the radian wave frequency. If the device geometry and basic mass properties are known, an estimate of $Z_i$ for a WEC can be estimated from the outputs of a boundary-element method code, excluding viscous damping. In this way, a model of device impedance suitable for initial controller development is available early in the design process.

Control Process

Figure 2:
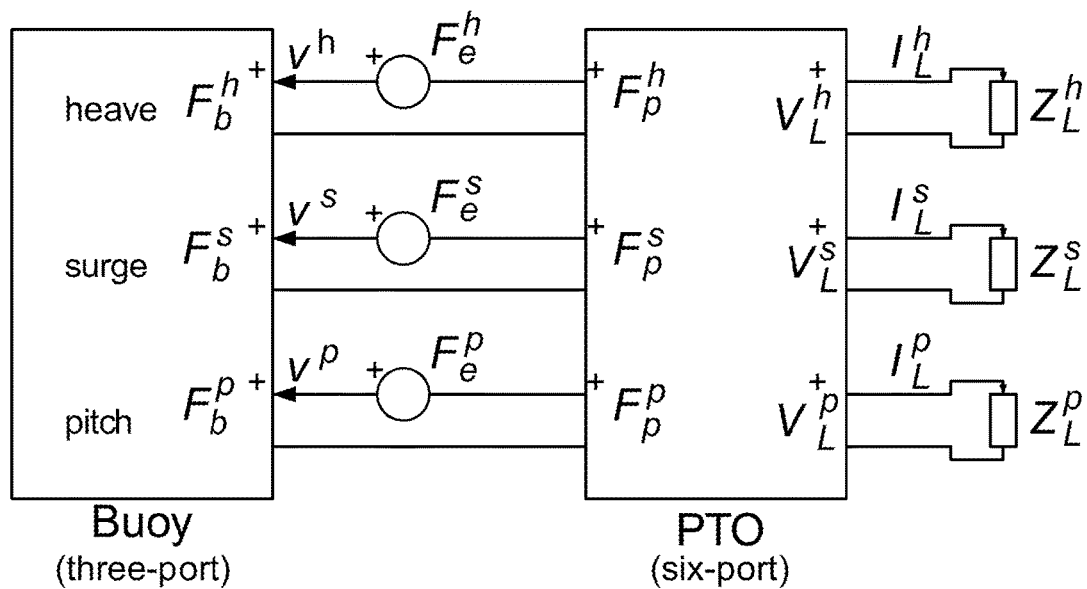
FIG. 2 is a Multi-Port representation on the WaveBot according to an embodiment of the disclosure.
Figure 3:
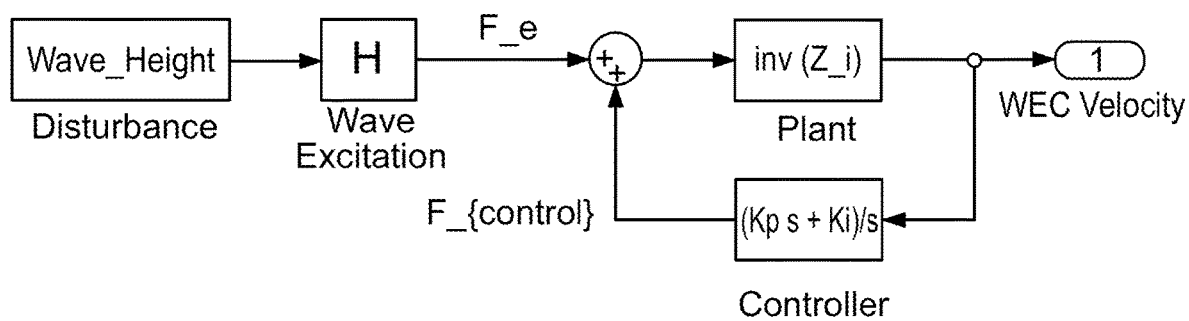
FIG. 3 is a Block diagram of a linear system model assumed for controller self-tuning according to an embodiment of the disclosure. The inverse of the WEC intrinsic impedance $Z_i$ is used as the plant model.

FIG. 2 illustrates a model of the WEC as a two-block multi-port circuit. The buoy block captures the hydrodynamic interactions between the device and the wave (forces/torques F, and velocities v), and the PTO describes the generators. In this model, the electrical power (to be maximized through controller design), is the sum of the powers dissipated on the electrical loads $Z_L^h$, $Z_L^s$, $Z_L^p$ (the product of voltages across V and currents I through each load), where the superscripts h, s, and p indicate the heave, surge and pitch DOFs, respectively. Because each DOF has an independent and identical PTO the six-port model of the PTO becomes diagonal and can be represented as 3 two-port elements between motor force/velocity and quadrature voltage/current, $$\begin{bmatrix} I_q^i \\ V_q^i \end{bmatrix} = \begin{bmatrix} 0 & (k_t^i n^i)^{-1} \\ k_e^i n^i & r(k_t^i n^i)^{-1} \end{bmatrix} \begin{bmatrix} v^i \\ F_p^i \end{bmatrix} \qquad (2)$$

where i is an index specifying the DOF (h, s, or p) and the parameters $k_t^i$, $k_e^i$, $n^i$ and r are the torque constant (Nm/A), electrical constant (Vs/rad), gear ratio, and winding resistance (Ohm) respectively. Due to the identical PTOs, $k_t$=6.17, $k_e$=4.12, and r=0.50 for all DOF, while $n^{h,s}$=12.47 but $n^p$=3.00 due to the inclusion of the gearhead on the pitch DOF. A diagonal proportional-integral controller form was selected due to its broad familiarity $$C = \begin{bmatrix} K_p^h + \frac{K_i^h}{s} & 0 & 0 \\ 0 & K_p^s + \frac{K_i^s}{s} & 0 \\ 0 & 0 & K_p^p + \frac{K_i^p}{s} \end{bmatrix} \qquad (3)$$

where s (non-superscript) is the Laplace transform variable. Note that the absence of off-diagonal terms that the controller does not respond to coupling between the surge and pitch degrees of freedom. As shown in FIG. 3, the controller uses a measurement of velocity in heave, surge, and pitch to prescribe a force to the motor on each DOF. (A model of the transfer function H relating wave height to excitation force is not needed for controller tuning.) It can be shown that the electrical power absorbed by the WEC is $$P_{abs} = \frac{3}{4}\text{real}\big((NK_t)^{-1}C\Omega\big)^*\big((K_eN + R(NK_t)^{-1}C)\Omega\big) \quad (4)$$

where $\Omega=[v^h, v^s, v^p]$, the frequency-domain closed-loop model of WEC velocity, and $K_t$, $K_e$, R, and N are 3×3 diagonal matrices of parameters $k_t^{h,s,p}$, $k_e^{h,s,p}$, $r^{h,s,p}$ and $n^{h,s,p}$ respectively. In (4), * implies the complex conjugate transpose and script R implies the real part. By the sign convention of C, $P_{abs}<0$ for power absorbed by the WEC (that is, power capture is optimized when is $P_{abs}$ as negative as possible). By simple manipulation of the block diagram (FIG. 3), it can further be shown that $$\Omega=(Z_i-C)^{-1}F_e \quad (5)$$

Thus, for a given excitation force spectra $F_e$, and device intrinsic impedance model $Z_i$ (a 3×3 model), the minimum absorbed power is $P_{abs}$ attained for an optimal set of controller gains $$\eta_{opt}=\{K_p^n, K_i^n, K_p^s, K_i^s, K_p^p, K_i^p\}$$

the result of the optimization $$\eta_{opt} = \underset{\eta}{\arg\min} P_{abs}(\eta, F_e) \quad (6)$$

Using (4) this is solved iteratively in MATLAB via 'fminsearch', recalling that, by sign convention, a minimum of $P_{abs}$ maximizes captured power. With the exception of the first calculation (for which rough order-of-magnitude initial guesses were used), optimal gain estimates from the previous time step are used as the initial guess at the current time step.

Estimation of Excitation Force

Equation 6 requires a frequency-domain estimate of the excitation force spectra and a model of device intrinsic impedance. To obtain the latter, the device was subject to multisine excitation in all DOFs, with different phase realizations in each, such that motions in each DOF were approximately uncorrelated. The system identification procedure of Bacelli et al. (2017) was then employed to generate a non-parametric frequency-domain estimate of intrinsic device impedance $Z_i$, over the frequencies of interest (0.05 to 2 Hz).

Considering the simplified linear model (FIG. 3), where $inv(Z_i)$ is the inverse of the impedance model, measured WEC velocity spectra, $V(\omega)$, and controller force spectra, $F_{control}(\omega)$, can be used to estimate the excitation force spectra Fe for each DOF. Frequency domain estimates of $V(\omega)$ and $F_{control}(\omega)$ were obtained from real-time experimental time-domain measurements of WEC velocity, $v(t)$, and controller force, $f_{control}(t)$. First, time-domain measurements were down-sampled from 1 kHz to 4 Hz and then a Hamming window was applied to a buffer of 1024 points (i.e., 256 seconds). The Discrete Fourier transform was then applied to this window. Subsequent windows overlap by 1020 points, implying that a Fourier transform is computed each second. Frequencies between 0.15 and 2 Hz are considered in Equation 7, known a priori to bound the energy spectra of all selected wave cases (Table 1), such that high-frequency noise or DC-offsets are not included in $F_e(\omega)$ estimations. Spectral estimates were found to be largely insensitive to the extent of down-sampling, overlap, and window length, provided that windows were long enough to estimate the excited frequencies and numerous enough to provide adequate smoothing when averaged.

$$F_e(\omega)=Z_i(\omega)V(\omega)-F_{control}(\omega) \quad (7)$$

TABLE 1

Selection of wave ID codes.

| Wave ID | Type | T or $T_P$ (s) | H or $H_s$ (m) |
|---------|------|----------------|----------------|
| 2A | JONSWAP | 1.58 | 0.127 |
| 10A | JONSWAP | 3.5 | 0.254 |
| CDIP | Data | Varies | Varies |

Changing Sea-States

The self-tuning control law was tested in variety of changing sea-states. In this work, we focus on two: an approximation of an 'instantaneous' change in sea-state created by abutting two wave time series from distinct irregular sea-states, and a ⅕th Froude-scaled time-series developed from Coastal Data Information Program (CDIP) ocean buoy 225 at the Wave Energy Test site in Kaneohe Bay, Hi. This buoy data was selected as it captures the sea-state evolution during an approaching storm, representing a rapid, though realistic, rate of change. Irregular waves are defined by a JONSWAP spectra with γ=3.3 (Hasselmann et al. (1973)), and the shorthand wave ID codes are explained in Table 1.

To evaluate controller performance, each wave case was run a minimum of 2 times. During one of these runs, the WEC was removed from the water. Wave height sensors at the nominal device location were used to characterize the exciting wave field without the influence of device-initiated wave reflections or radiations. This measured wave state can be compared to that estimated (7) to evaluate the performance of the spectral estimator.

Results

A comparison between estimated excitation force spectra (7) and excitation force spectra calculated from measured wave height spectra at WEC location during the calibration study is calculated as $$F_{e,actual}(\omega)=H(\omega)\eta(\omega) \quad (8)$$

where H is the identified 1×1 transfer function between input wave height to output excitation force in heave. Of the 3 DOF, heave was selected for this calculation because it consistently showed the largest dynamic responses, resulting in a large signal-to-noise ratio across all sea-states. This estimate from measured wave height is compared to the heave DOF estimate used by the self-tuning controller from (7), which does not use a measurement of wave height or estimate of the excitation model. To evaluate controller performance, an estimate of excitation force spectra (7) was used to calculate $P_{abs}$ (4) over a dense grid of $K_p$ and $K_i$ gains for each DOF. This allowed a $P_{abs}$ surface to be post-calculated for each sea state. The gains to which the self-tuning controller converged can be compared against the minima of these surfaces to consider the optimality of controller performance for that sea-state.

CDIP Buoy Sea-State

The spectrogram of incident waves was produced with time series of controller gains in heave, surge, and pitch to show the adaptation over time. Contrasting wave states at times 7000 s (wave state 1, relatively calm water) and 24600 s (wave state 2, a storm condition) were then examined in detail to show the performance of the algorithms in very conditions.

A comparison of the estimated spectra (7) to the actual spectra (8) was performed. Estimates for both wave states agree closely: the elevation in spectral energy at the decreased frequency for the second wave state is clearly seen in the estimate, although (7) tends to slightly over-predict excitation force at higher frequencies (0.8 to 1 Hz), where the signal to noise ratios of the terms used in (7) are reduced. The reduced accuracy of the estimation in this range implies in turn that the WEC is less able to absorb power at these higher frequencies, but given the ~20 db reduction in magnitude at these frequencies, there is little power available.

Because heave is nearly independent from surge and pitch, the heave power surface is described as a function of $K_p^h$ and $K_i^h$. However, due to the coupling of surge and pitch DOFs, their power surface is four-dimensional (two gains for each DOF). For visualization, a 2D slice was taken of this surface at the optimal surge gains (for the pitch subplot) and the optimal pitch gains (for the surge subplot) such that the self-tuning and optimal controller gains also appear on this slice. Self-tuning gains are near the optimum of the power surface, which indicates a maximized WEC power production, for all degrees of freedom for both wave states. Note that the surface has small gradients near the optimum: this implies both that an optimizer may not reliably converge precisely to the minimum, and that system electrical power is not sensitive to gain selection within this region.

Concatenated Sea-States

As an example of concatenated wave series, the spectrogram of wave spectra was created for an alternating wave state 2A to 10A over 5 minute intervals, with time series of controller gains in heave, surge, and pitch to show the adaptation over time. Contrasting wave states at time 250 s and 1200 s were then examined in detail.

Note that in this case, the peak wave period of state 2A is 1.58 s (0.63 Hz), which is nearly the WEC resonant frequency in heave (~0.62 Hz). As expected, the $K_i^h$ is near zero during this wave state (at resonance, the optimal $K_i$ gain is zero). The explicitly known transition time of a concatenated wave series allows consideration of the gain adaptation time. The wave state transition is implemented at multiples of 300 s, and the gain adjustment begins approximately 200 s after this. The delay is due to two factors. Firstly, inspection of the spectrogram indicates that the commanded wave transition takes approximately 60 s to manifest in the basin. Second and more significantly, the window length of 256 s will only fully reflect the next sea state after this length of time, and the interim gain will be calculated based upon an average of the two wave states. Accounting for these delay contributions, the gain adapts fairly quickly.

The estimated excitation spectra (not shown) predict excited frequencies well, but again slightly over-estimate amplitudes of higher frequencies (f>0.7 Hz). The power surfaces for this wave series indicate that the self-tuning controller gains (dots) are again near the maximum of the post-calculated surface (crosses), which is again flat in the surrounding region, for each wave state and degree of freedom. The largest deviation from the minimum occurs for heave in the first wave state: however, power captured by the self-tuning gains are within 1% of the maximum post-calculated power. The minima location changes more significantly for heave than for surge and pitch, indicating the latter modes to be less sensitive to this changing sea state Discussion of Modeling Results A six-parameter self-tuning controller was implemented successfully in real-time with 1 KHz sampling on a real-time target machine with two 1.4 GHz processors with a mean execution time of 8.53e-5 seconds: an execution time >10 times faster than necessary to execute this sampling rate in real time on the small-scale device, which requires faster sampling than an equivalent full-scale device. Gains converged quickly once the buffer from which the spectral estimate was calculated well-approximated the current wave state: particularly for concatenated wave states, the 256 s buffer window appears to significantly delay gain tuning. While it is likely possible to reduce this window time, it is not likely to be necessary in a realistic sea. The present spectral estimate is robust and accurate, and convergence to optimal gains is on the order of minutes. While this is an unallowable delay for sea-states changing on the order of minutes, as in the concatenated wave tests, this is more than adequate for sea states changing over realistic time scales (hours to days), as evidenced particularly by the CDIP225 sea-state investigated above.

Negative values of $K_i$ provide optimum power capture for sea-states where excitation frequencies are lower than WEC resonance by acting as a negative spring, counter-acting hydrostatic restoring stiffness and reducing system resonant frequency. Provided these negative gains do not overcome the hydrostatic stiffness of the device, the system can remain closed-loop stable. This stability bound was not explicitly enforced in the described optimization, and while the tuning procedure never approached instability, incorporating limits on gain values would increase the robustness of the self-tuning controller.

Converged self-tuning gains consistently find the optimal gains for each degree of freedom and wave state. Thus, the performance of the self-tuning controller is commensurate with optimal PI controllers investigated in literature. For example, Cho et al. (Cho, H., Bacelli, G., and Coe, R. G. (2019b). Model predictive control tuning by inverse matching for a wave energy converter. Energies, 12(21), 1-18.doi: 10.3390/en12214158) attain nearly theoretical limits on performance over a narrow bandwidth, resulting in ~90% power capture compared to optimal complex conjugate control. Thus, the performance of the self-tuning controller is commensurate with optimal PI controllers investigated in literature. For example, Cho et al. (Cho, H., Bacelli, G., and Coe, R. G. (2019b). Model predictive control tuning by inverse matching for a wave energy converter. Energies, 12(21), 1-18.doi:10.3390/en12214158) shows nearly theoretical limits on performance over a narrow bandwidth, resulting in ~90% power capture compared to optimal complex conjugate control. The flatness of the electrical power surface near the optimal gain selection in all examined wave cases suggests that this may be a robust feature of this device that is not likely to vary significantly with wave state, and the electrical power production is not particularly sensitive to gain selection. Further, electrical power may be somewhat insensitive to minor modeling errors. With regard to software implementation, in order to run in real-time, the optimization must converge before the spectra are updated. This somewhat limits the potential gain adjustment time. Further, if the optimization problem is not convex, convergence over any reasonable interval may not be ensured in real-time. In this instance, a look-up table correlating precalculated gains to the estimated sea-state could instead be employed. While selected gains cannot be proven to be globally optimal, they can be selected to deliver good performance and be attainable on WEC hardware.

While the PI controller relies on feedback, the fminsearch gain-tuning procedures (and the suggested table look-up) are open-loop, using the model of device intrinsic impedance. Any inaccuracy in this model, or a change in the system over a long deployment will reduce the efficacy of this method. Assuming the gain optimization problem remains sufficiently convex, this limitation could be addressed by incorporating an extremum-seeking controller using power feedback to adjust model-informed gains to account for modeling error or a change in system impedance over time.

Finally, this control law is fundamentally single-objective and does not explicitly handle constraints. For longer deployments, it is necessary to also limit the structural loads experienced by the device. The magnitude of the loads experienced by the device can be related to the magnitude of the excitation spectra through identifiable transfer functions. This self-tuning control law can be generalized to any convex cost function. For this case, incorporating load-related terms in (6) would broaden control objectives, although the relative weighting between load-mitigating and power-maximizing objectives would likely be determined on a case-by-case basis. With regard to constraints, it has been shown previously (Cho et al.) that a "predictionless" model-predictive controller can be tuned to approximate PI control performance while also explicitly handling constraints. While it may be too computationally intensive to be reasonably implemented in real-time, this suggests an additional step to the proposed control law that would use the identified PI control gains to subsequently derive a model-predictive controller that handles relevant constraints.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method for controlling the energy production of a wave energy converter (WEC) platform on a body of water, the method comprising:
   monitoring motor energy output and at least one energy parameter of one or more motors of the WEC platform, each motor of the one or more motors actuated by wave motion;
   monitoring sea state of the body of water using device impedance models that receive inputs from sensing and measuring WEC platform motion and monitoring the frequency spectrum of the WEC platform motion;
   analyzing motor energy output of the one or more motors and sea state to determine a controller gain that optimizes the energy production of the WEC platform; and
   applying a control law at the one or more motors to set torque at the one or more controllers;
   wherein the controller gain determines motor torque of the one or more motors based on the WEC platform motion and provides the controller gain to motor drive circuits of the one or more motors to set torque delivered to the motor based on the determination of controller gain;
   wherein the at least one energy parameter is frequency of WEC platform motion or motor velocity.

2. The method of claim 1, wherein the at least one energy parameter is selected from the group consisting of frequency of the WEC platform or motor velocity of the one or more motors.

3. The method of claim 1, wherein the one or more motors is three motors wherein one motor of the three motors is in each three degrees-of-freedom of motion of the WEC platform corresponding to heave, pitch and surge.

4. The method of claim 1, wherein the one or more motors is two motors wherein the two motors are in two degrees of freedom selected from heave, pitch and surge.

5. The method of claim 1, wherein analyzing sea state to determine the controller gain comprises analyzing a history of recent motion of the WEC platform.

6. The method of claim 5, wherein a history of recent motion of the WEC platform comprises frequency of a prevailing wave.

7. A wave energy converter control system, comprising:
   a controller comprising a non-transitory computer-readable medium with instructions stored thereon, that when executed by a processor, perform the steps comprising:
   using a frequency-domain estimate of the current sea-state to automatically tune the controller to maximize power absorption by using a self-tuning control law to adjust the motor torques of a wave energy converter in changing sea-states to maximize electrical power capture; and
      analyzing motor energy output of one or more motors and sea state to determine controller gain that optimizes energy production.

8. The system of claim 7, wherein the control law uses a spectral estimation of the wave excitation forces that relies on an identified model of device intrinsic impedance.

9. The system of claim 7, wherein the performance of the control law is considered by comparing the gains resulting from the self-tuning approach to post-calculated optimal gains for a given sea-state.

10. A wave energy conversion system, comprising:
    a wave energy converter (WEC) platform, comprising;
       a housing; and
       a carriage disposed within the housing;
    a float connected to the housing by a shaft that is partially disposed within the carriage; and
    one or more motors connected to the carriage or housing;
    wherein the one or more motors are powered by the float responding to a wave in corresponding one or more degrees-of-freedom corresponding to heave pitch and surge of the wave;
    and
    a wave energy converter control system, comprising:
       a controller that uses a frequency-domain estimate of the current sea-state to automatically tune the controller to maximize power absorption by using a self-tuning control law to adjust the motor torques of a wave energy converter in changing sea-states to maximize electrical power capture.

11. The system of claim 10, wherein the control law uses a spectral estimation of the wave excitation forces that relies on an identified model of device intrinsic impedance.

12. The system of claim 10, wherein the performance of the control law is considered by comparing the gains resulting from the self-tuning approach to post-calculated optimal gains for a given sea-state.

* * * * *